US010044506B2

(12) United States Patent
Seo

(10) Patent No.: US 10,044,506 B2
(45) Date of Patent: Aug. 7, 2018

(54) METHOD FOR CONTROLLING FUNCTION AND AN ELECTRONIC DEVICE THEREOF

(71) Applicant: Samsung Electronics Co., Ltd., Gyeonggi-do (KR)

(72) Inventor: Jin Seo, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 15/133,493

(22) Filed: Apr. 20, 2016

(65) Prior Publication Data

US 2016/0315770 A1 Oct. 27, 2016

(30) Foreign Application Priority Data

Apr. 21, 2015 (KR) ........................ 10-2015-0055999

(51) Int. Cl.

*G06K 9/36* (2006.01)
*G06K 9/46* (2006.01)
*H04L 9/32* (2006.01)
*H04B 1/3888* (2015.01)

(52) U.S. Cl.

CPC ............. *H04L 9/32* (2013.01); *H04B 1/3888* (2013.01)

(58) Field of Classification Search

None

See application file for complete search history.

(56) References Cited

U.S. PATENT DOCUMENTS 4,276,768 A * 7/1981 Dadachanji ............ G01N 25/68 374/28
7,200,323 B1 * 4/2007 Evans ...................... H04N 5/85 360/60
7,536,885 B1 * 5/2009 Ross ................... E05B 65/1073 292/251.5
7,613,333 B2 * 11/2009 Aoki .................. G06K 9/00885 382/115
8,184,866 B2 * 5/2012 Takaku .............. G07C 9/00158 382/115
8,289,115 B2 * 10/2012 Cretella, Jr. .......... G06F 1/1626 206/320
8,624,695 B2 * 1/2014 Cretella, Jr. .......... G06F 1/1626 206/320
8,793,519 B2 * 7/2014 Hong .................... G06F 1/1626 323/318
8,922,506 B2 * 12/2014 Jung ..................... G06F 1/1626 205/777
8,946,925 B2 * 2/2015 Maltaverne ............. E05B 17/22 307/10.2
9,069,339 B2 * 6/2015 Cretella, Jr. .......... G06F 1/1626
9,246,532 B2 * 1/2016 Agnes Desodt ..... H04B 1/3888
9,444,425 B2 * 9/2016 Mow ........................ H03H 7/38
9,461,690 B2 * 10/2016 Jung ..................... G06F 1/1626
9,571,630 B2 * 2/2017 Jung ..................... G06F 1/1626
9,619,776 B1 * 4/2017 Ford ................ G06Q 10/08355

(Continued)

*Primary Examiner* — Feng Niu

(74) *Attorney, Agent, or Firm* — Cha & Reiter, LLC.

(57) ABSTRACT

An electronic device comprising: a cover; a sensing unit; a memory; and at least one processor operatively coupled to the memory and the cover, configured to: acquire authentication information by using the sensing unit; detect a current state of the cover; and disable a locking function in response to detecting that the cover is in a closed state and the authentication information satisfies a first condition.

18 Claims, 19 Drawing Sheets

1210

(56) References Cited

U.S. PATENT DOCUMENTS

2003/0155081 A1* 8/2003 Goodman ............... E05D 15/26 160/84.02
2010/0008544 A1* 1/2010 Abe ........................ G06F 21/32 382/115
2011/0281633 A1* 11/2011 Park ....................... G06Q 30/02 463/20
2012/0057064 A1* 3/2012 Gardiner ............... G06F 1/1626 348/333.12
2012/0176543 A1* 7/2012 Jeong .................. G06F 3/04883 348/563
2012/0218231 A1* 8/2012 Slaby .................. G06F 3/04886 345/178
2013/0073428 A1* 3/2013 Thramann .............. G06Q 30/00 705/26.9
2013/0213100 A1* 8/2013 Cohen ................. E05B 47/0611 70/283.1
2014/0053097 A1* 2/2014 Shin ...................... G06F 9/4443 715/779
2014/0121855 A1* 5/2014 Cretella, Jr. .......... G06F 1/1626 700/302
2014/0132502 A1* 5/2014 Yang ..................... G06F 3/0487 345/156
2014/0300529 A1 10/2014 Kim et al.
2014/0304738 A1* 10/2014 Nakaoka ............. G06F 17/2247 725/37
2014/0319550 A1 10/2014 Yamazaki et al.
2015/0005034 A1* 1/2015 Agnes Desodt ..... H04B 1/3888 455/566
2016/0005250 A1* 1/2016 Inoue .................... B60R 25/209 701/2
2016/0026381 A1* 1/2016 Kim .................... G06F 3/04817 715/761
2016/0132169 A1* 5/2016 Landau ................. G06F 3/0416 345/173
2017/0024686 A1* 1/2017 Thramann .............. G06Q 30/00

* cited by examiner

METHOD FOR CONTROLLING FUNCTION AND AN ELECTRONIC DEVICE THEREOF

CLAIM OF PRIORITY

This application claims the benefit under 35 U.S.C. § 119(a) of a Korean patent application filed in the Korean Intellectual Property Office on Apr. 21, 2015 and assigned Serial No. 10-2015-0055999, the entire disclosure of which is hereby incorporated by reference.

BACKGROUND

1. Field of the Disclosure

Various embodiments of the present disclosure relate to electronic devices, in general, and more particularly to a method for controlling a function, and an electronic device thereof.

2. Description of the Related Art

An electronic device can provide various services to a user by supporting various functions.

The electronic device is now used for many purposes in addition to simple telephone calls or scheduling. For example, the electronic device now provides a variety of functions, such as games, remote controlling using near field communication, capturing images using a built-in digital camera, etc., to satisfy users' demands.

In addition, the electronic device may have an openable and closable cover. For example, the cover used by the electronic device may be a protection cover also having a screen protection function or a display device for providing a display function. Further, a closed state of the cover is maintained when the electronic device is not used, and the user opens the cover to use the electronic device.

SUMMARY

According to aspects of the disclosure, an electronic device is provided comprising: a cover; a sensing unit; a memory; and at least one processor operatively coupled to the memory and the cover, configured to: acquire authentication information by using the sensing unit; detect a current state of the cover; and disable a locking function in response to detecting that the cover is in a closed state and the authentication information satisfies a first condition.

According to aspects of the disclosure, a method is provided for use in an electronic device, comprising: acquiring authentication information by using a sensing unit; detecting a current state of a cover of the electronic device; and disabling a locking function in response to detecting that the cover is in a closed state and the authentication information satisfies a first condition.

According to aspects of the disclosure, a non-transitory computer-readable medium is provided that stores one or more processor-executable instructions which when executed by at least one processor cause the at least one processor to execute a method comprising the steps of: acquiring authentication information by using a sensing unit; detecting a current state of a cover of an electronic device; and disabling a locking function in response to detecting that the cover is open and the authentication information satisfies a condition.

DETAILED DESCRIPTION

Figure 1:
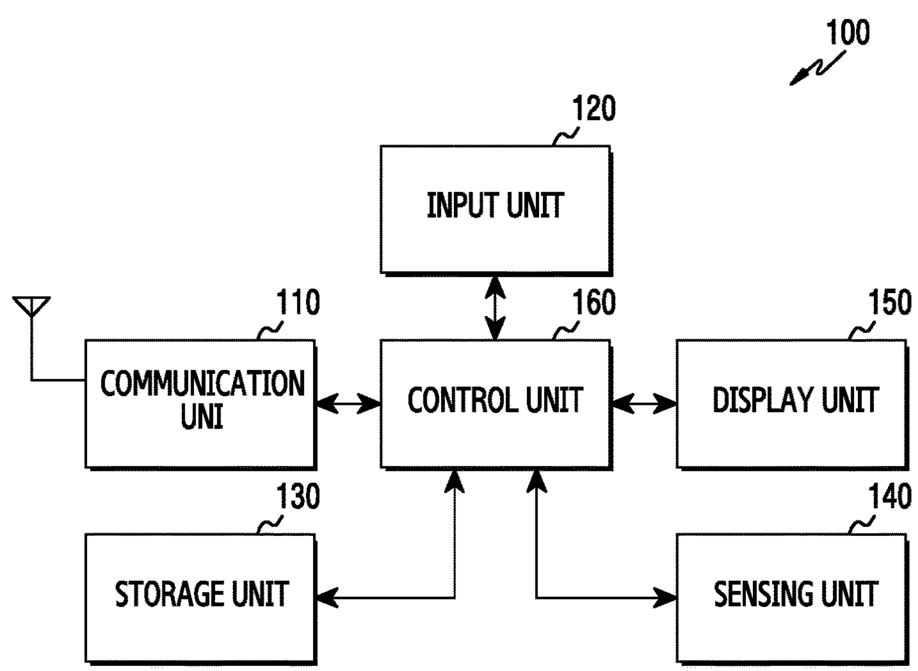
FIG. 1 is a block diagram of an example of an electronic device, according to various embodiments of the present disclosure.

Hereinafter, various embodiments of the present disclosure will be described in detail with reference to the accompanying drawings. In the following description, specific details such as detailed configuration and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and scope of the present disclosure. In describing the drawings, similar reference numerals may be used to designate similar elements.

The terms “have”, “may have”, “include”, or “may include” used in the various embodiments of the present disclosure indicate the presence of disclosed corresponding functions, operations, elements, and the like, and do not limit additional one or more functions, operations, elements, and the like. In addition, it should be understood that the terms “include” or “have” used in the various embodiments of the present disclosure indicate the presence of features, numbers, steps, operations, elements, parts, or a combination thereof described in the specifications, and do not preclude the presence or addition of one or more other features, numbers, steps, operations, elements, parts, or a combination thereof.

The terms “A or B”, “at least one of A or/and B” or “one or more of A or/and B” used in the various embodiments of the present disclosure include any and all combinations of words enumerated with it. For example, “A or B”, “at least one of A and B” or “at least one of A or B” means (1) including at least one A, (2) including at least one B, or (3) including both at least one A and at least one B.

Although terms such as “first” and “second” used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be referred to as a second element without departing from the scope of various embodiments of the present disclosure, and similarly, a second element may be referred to as a first element.

It will be understood that when an element (e.g., first element) is “connected to” or “(operatively or communicatively) coupled with/to” another element (e.g., second element), the element may be directly connected or coupled to another element, and there may be an intervening element (e.g., third element) between the element and another element. Furthermore, it will be understood that when an element (e.g., first element) is “directly connected” or “directly coupled” to another element (e.g., second element), there is no intervening element (e.g., third element) between the element and another element.

The expression “configured to (or set to)” used in various embodiments of the present disclosure may be replaced with “suitable for”, “having the capacity to”, “designed to”, “adapted to”, “made to”, or “capable of” according to the situation. The term “configured to (set to)” does not necessarily mean “specifically designed to” at a hardware level. Instead, the expression “apparatus configured to . . . ” may mean that the apparatus is “capable of . . . ” along with other devices or parts in a certain situation. For example, “a processor configured to (set to) perform A, B, and C” may be a dedicated processor, e.g., an embedded processor, for performing a corresponding operation, or a general-purpose processor, e.g., a Central Processing Unit (CPU) or an application processor (AP), capable of performing a corresponding operation by executing one or more software programs stored in a memory device.

The terms and expressions as used herein are used merely to describe certain embodiments and do not limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may include at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device (e.g., a head-mount-device (HMD), electronic eye-glasses, electronic clothing, an electronic bracelet, an electronic necklace, an electronic appcessory, an electronic tattoo, a smart mirror, or a smart watch).

An electronic device according to various embodiments of the present disclosure may be a smart home appliance and may include a television (TV), a digital video disk (DVD) player, an audio component, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™, a game console (e.g., Xbox™ PlayStation™), an electronic dictionary, an electronic key, a camcorder, or an electronic frame.

An electronic device according to various embodiments of the present disclosure may include a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine), a navigation device, a global positioning system (GPS) receiver, an event data recorder (EDR), a flight data recorder (FDR), an in-vehicle infotainment device, an electronic equipment for a ship (e.g., ship navigation equipment and/or a gyrocompass), an avionics equipment, a security equipment, a head unit for vehicle, an industrial or home robot, an automatic teller machine (ATM), point of sale (POS) terminal, or an Internet of Things (IoT) device (e.g., a light bulb, various sensors, an electronic meter, a gas meter, a sprinkler, a fire alarm, a thermostat, a streetlamp, a toaster, a sporting equipment, a hot-water tank, a heater, a boiler and the like).

An electronic device according to various embodiments of the present disclosure may include at least one of a piece of furniture or a building/structure, an electronic board, an electronic signature receiving device, a projector, and various measuring instruments (e.g., a water meter, an electricity meter, a gas meter, or a wavemeter).

An electronic device according to various embodiments of the present disclosure may also include a combination of one or more of the above-mentioned devices. Further, it will be apparent to those skilled in the art that an electronic device according to various embodiments of the present disclosure is not limited to the above-mentioned devices.

FIG. 1 is a block diagram of an example of an electronic device, according to various embodiments of the present disclosure.

Referring to FIG. 1, an electronic device 100 according to various embodiments of the present disclosure may include a communication unit 110, an input unit 120, a storage unit 130, a sensing unit 140, a display unit 150, and a control unit 160.

The communication unit 110 performs communications on behalf the electronic device 100. In this case, the communication unit 110 may communicate with an external device (not shown) by using various communication schemes. Herein, the communication unit 110 may perform at least any one of wireless communication and wired communication. For this, the communication unit 110 may access at least any one of a mobile communication network and a data communication network. Alternatively, the communication unit 110 may perform near distance communication. For example, the external electronic device may include an electronic device, a base station, a server, and a satellite. In addition, the communication scheme may include Long Term (LTE), Wideband Code Division Multiple Access (WDCMA), Global System for Mobile Communications (GSM), Wireless Fidelity (WiFi), Bluetooth, and Near Field Communications (NFC).

The input unit 120 generates input data in the electronic device 100. In this case, the input unit 120 may generate the input data in response to a user input of the electronic device 100. In addition, the input unit 120 may include at least one input means. The input unit 120 may include a keypad, a dome switch, a physical button, a touch panel, a jog & shuttle, and a sensor.

The storage unit 370 may include any suitable type of volatile or non-volatile memory, such as Random-access Memory (RAM), Read-Only Memory (ROM), Network Accessible Storage (NAS), cloud storage, a Solid State Drive (SSD), etc. In operation, the storage unit 130 may store operational programs of the electronic device 100. In this case, the storage unit 130 may store a program (or application) for executing various functions. Further, the storage unit 130 may store data generated when the respective functions are performed. According to various embodiments, data stored in the storage unit 130 may include information for enabling and/or disabling a locking function, information for executing a bookmark function, bookmark information registered (or stored) by the electronic device 100, or the like.

The sensing unit 140 may include at least one sensor for collecting information related to at least one of user information, situation information, and state information. Herein, the user information may be related to authentication information. For example, the sensing unit 140 may acquire the user information by using an iris sensor, a fingerprint sensor, or the like. In addition, the situation information may be related to at least one of a situation of sensing an input for the sensing unit 140 and a situation in which the sensing unit 140 moves based on the input. For example, the sensing unit 140 may acquire the situation information by using a geomagnetic sensor, an acceleration sensor, a digital compass, a tilt sensor, or the like. In addition, the state information may be related to a user's body state. For example, the sensing unit 140 may acquire any suitable type of biometric information of the user by using a biosensor. For example, the user's biometric information may identify the user's body temperature, heart rate, oxygen saturation, or the like.

The display unit 150 may output display data. In this case, the display unit 150 may display an execution screen corresponding to at least one of a plurality of functions of the electronic device 100. The display unit 150 may include a Liquid Crystal Display (LCD), a Light Emitting Diode (LED) display, an Organic Light-Emitting Diode (OLED) display, a Micro Electro Mechanical System (MEMS) display, and an electronic paper display. Herein, the display unit 150 may be implemented in a touch screen by being coupled to the input unit 120. According to various embodiments, the electronic device 100 may include at least one display unit 150.

The control unit 160 may include at least one processor. The at least one processor may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. For example, the control unit 160 may perform a predefined function by analyzing information acquired by the sensing unit 140. Herein, the predefined function may be related to at least one of a locking function and a bookmark function.

Figure 3A:
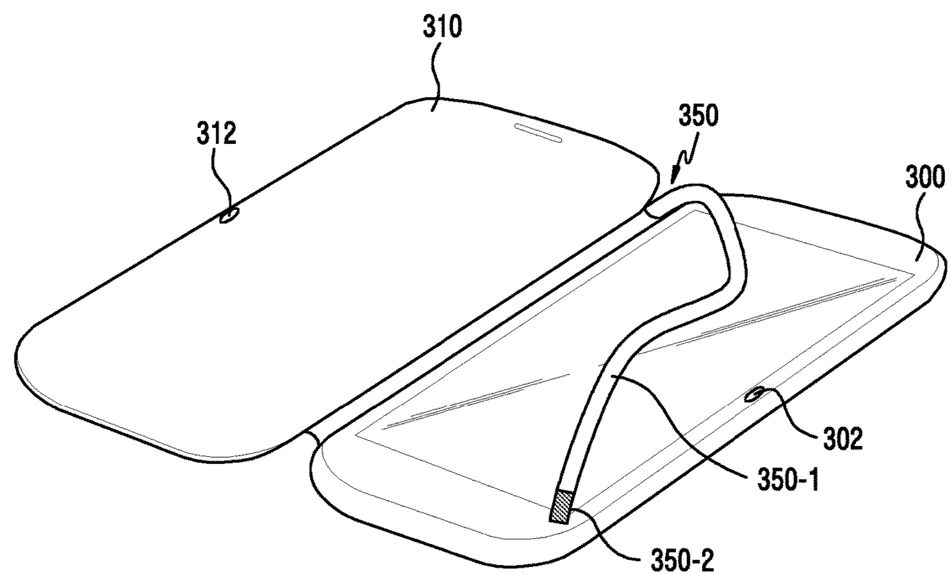
FIG. 3A is a diagram illustrating an example of an electronic device, according to various embodiments of the present disclosure.
Figure 3B:
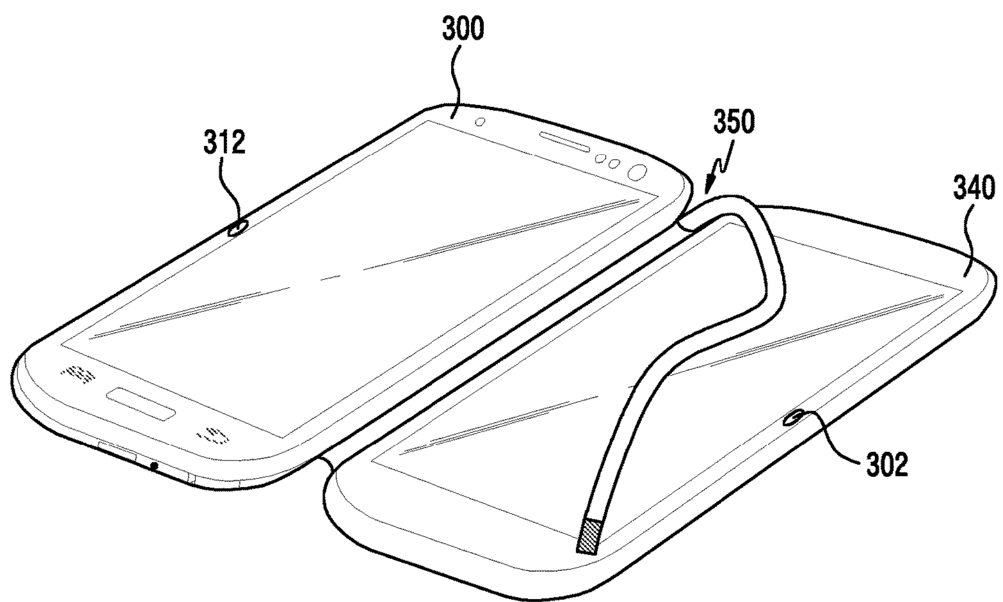
FIG. 3B is a diagram illustrating an example of an electronic device, according to various embodiments of the present disclosure.

According to one embodiment, the control unit 160 may disable the locking function on the basis of user information acquired by the sensing unit 140. In this case, the control unit 160 may acquire the user information in a closed state of a cover operatively coupled to the electronic device 100. Further, the cover operatively coupled to the electronic device 100 may be the protection cover having the screen protection function as shown in FIG. 3A or may be the display device for providing the screen display function as shown in FIG. 3B. Furthermore, the closed state of the cover may be a state where the screen of the electronic device 100 is covered, and the electronic device 100 may acquire the user information through the sensing unit 140 or a sensor separated from the sensing unit 140.

According to another embodiment, the control unit 160 may perform the bookmark function on the basis of the situation information acquired by the sensing unit 140. In this case, the control unit 160 may acquire the situation information in an open state of the cover. In addition, the open state of the cover may be a state where the cover is opened from the screen of the electronic device 100.

According to various embodiments, the control unit 160 may include a processor for executing one or more software programs stored in a memory device (e.g., the storage unit 130). That is, the aforementioned operation of the control unit 160 may be executed by the software program executed by the processor.

Figure 2:
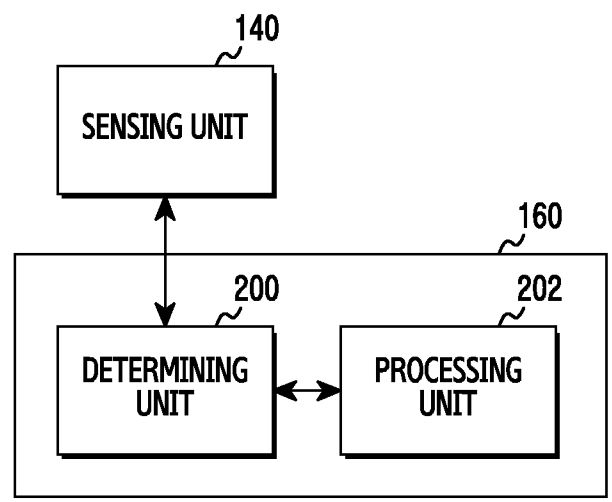
FIG. 2 is a diagram of an example of a control unit, according to various embodiments.

FIG. 2 is a diagram of an example of a control unit of the electronic device 100, according to various embodiments.

Referring to FIG. 2, the control unit 160 may include a determining unit 200 and a processing unit 202.

According to various embodiments, the determining unit 200 may determine a user who controls the electronic device 100 or the sensing unit 140. For example, the determining unit 200 may acquire information which can be used to determine the user from the sensing unit 140, and may compare this information with pre-registered information to recognize the user. That is, the determining unit 200 may perform at least one of a fingerprint recognition operation and an iris recognition operation on the basis of the information received from the sensing unit 140.

According to various embodiments, the determining unit 200 may determine whether the electronic device 100 or the sensing unit 140 is being used by the user. For example, the determining unit 200 may acquire information from the sensing unit 140, and may compare this information with predetermined information to determine whether the user grips the sensing unit 140 and/or moves the sensing unit 140.

According to various embodiments, the determining unit 200 may perform an operation of the sensing unit 140. For example, the determining unit 200 may include a sensor for collecting information related to at least one of user information, situation information, and state information.

According to various embodiments, the processing unit 202 may control the operation of the electronic device 100 on the basis of a determination result of the determining unit 200.

According to one embodiment, when a user who satisfies a condition controls the electronic device 100 or the sensing unit 140 is determined by the determining unit 200, the processing unit 202 may disable a locking function for at least the electronic device 100. For example, the locking function may include cover locking. For example, if the electronic device 100 and the cover maintain a locked state by using a magnet, the processing unit 202 may disable the locking function by deactivating the magnet. By way of example, deactivating the magnet may include turning off the magnet completely or reducing the magnetic force of the magnet to a level which permits the cover to be opened. For another example, the locking function may include screen locking, and the processing unit 202 may disable a screen locked state in response to the determining of the user who satisfies the condition.

According to various embodiments, if a control situation of the sensing unit 140 or the electronic device 100 which satisfies the condition is determined by the determining unit 200, the processing unit 202 may perform a bookmark function. In this case, the processing unit 202 may register information of an application currently being executed as bookmark information. For another example, the processing unit 202 may store a displayed screen as image data and then may register it as the bookmark information. For another example, the processing unit 202 may display a screen related to the registered bookmark information.

Figure 3C:
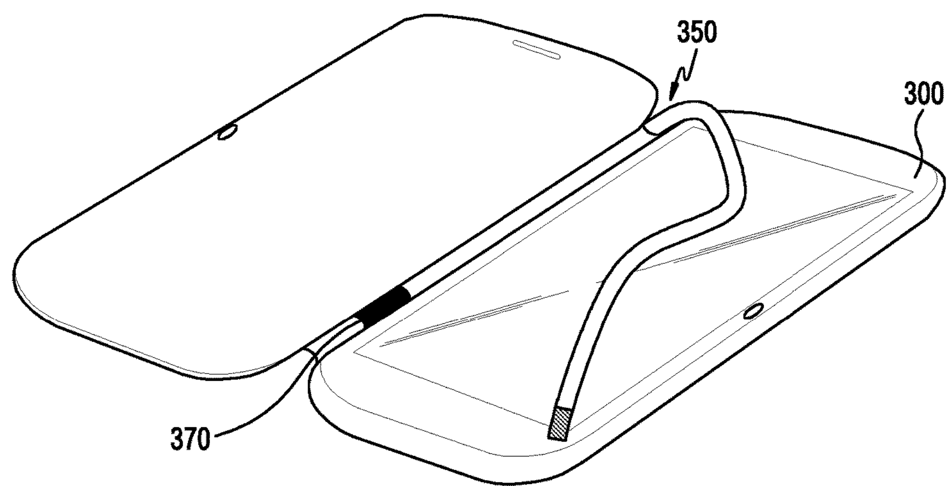
FIG. 3C is a diagram illustrating an example of an electronic device, according to various embodiments of the present disclosure.

FIGS. 3A-C are diagrams illustrating an example of an electronic device, according to various embodiments of the present disclosure.

According to various embodiments, as shown in FIG. 3A, an electronic device 300 may be the electronic device 100 of FIG. 1, and may include a sensing unit 350 and a cover 310. Herein, the cover 310 may be a protection cover having a screen protection function, and may have a structure capable of being coupled to the electronic device 300. For example, the cover 310 may be a protection cover coupled to a battery cover of the electronic device 300. The cover 310 may cover a screen of the electronic device 300 or may be opened from the screen of the electronic device 300.

In addition, the sensing unit 350 may be operatively coupled to the electronic device 300, and according to one embodiment, may be constructed of a first body 350-1 and a second body 350-2. The first body 350-1 may include a connection portion for connecting to the electronic device 300. The second body 350-2 may include at least one sensor. Herein, the sensor may be a sensor for collecting information related to at least one of a movement of the sensing unit 350, a user authentication, and a user's body state. In addition, at least one portion of the first body 350-1 may be formed of a flexible material, for example, glass fiber or the like. In this case, the sensing unit 350 may be transformed by an external force (e.g., user's force). For example, the sensing unit 350 may move in a direction corresponding to an input.

Further, the sensing unit 350 may be one electronic device. In this case, the sensing unit 350 may be attachable to or detachable from the electronic device 300.

In addition, the electronic device 300 and the cover 310 may maintain a locked state. Herein, the locked state may be for maintaining a state where the cover 310 covers the screen of the electronic device 300. For example, the electronic device 300 and the cover 310 may maintain the locked state by using one or more magnets. In such instances, magnetic members 302 and 312 may be included in a portion where the cover 310 and the electronic device 300 are in contact with each other.

According to another embodiment, as shown in FIG. 3B, an electronic device 300 may include a sensing unit 350 and a cover 340 for providing a screen display function. That is, the cover 340 may be a display device. In this case, the electronic device 300 and the cover 340 may be coupled to each other via a connection portion (e.g., a hinge). The electronic device 300 and the cover 340 which are coupled to each other may rotate in a predetermined direction and angle with respect to the connection portion.

According to another embodiment, as shown in FIG. 3C, an electronic device 300 including a sensing unit 350 and a cover 310 or 340 may include a sensor 370 for determining a movement of the sensing unit 350. For example, the electronic device 300 may use at least one of a proximity sensor and a touch sensor to determine whether the sensing unit 350 approaches to a predefined position. According to various embodiments, the electronic device 300 may sense an input for a part of an electronic pen and a body as the input of the sensing unit 350 through the sensor 370.

According to various embodiment, an electronic device may include a cover operatively coupled to the electronic device, a sensing unit including at least one sensor to collect information related to authentication, and a control unit for disabling a locking function in response to a state where the cover is opened to an extent of at least a threshold, after information satisfying a condition is collected by the sensing unit.

According to the various embodiments, the control unit may display a screen corresponding to predefined bookmark information, after disabling the locking function.

According to the various embodiments, the control unit may maintain a closed state of the cover by using a magnet, and may control the magnet so that the closed state is not maintained in response to the collecting of authentication information satisfying a condition by the sensing unit.

According to the various embodiments, the sensing unit may include a sensor for collecting information capable of determining a body state. According to the various embodiments, the controller may determine and store the body state in response to the sensing of the input for the sensing unit.

According to the various embodiments, the sensing unit may include a sensor for collecting information capable of determining a movement. According to the various embodiments, the controller may use the information collected by the sensing unit to confirm whether a movement satisfying a condition is sensed, and may set information related to a function being executed as bookmark information in response to the sensing of the movement satisfying the condition in an opened state of the cover.

According to the various embodiments, the control unit may set information related to a function being executed as bookmark information in response to a state where the cover is closed to an extent of at least a threshold.

According to the various embodiments, the control unit may execute the locking function in response to the state where the cover is closed to the extent of at least the threshold.

According to the various embodiments, the control unit may control a magnet to maintain a closed state of the cover in response to the state where the cover is closed by at least the threshold.

According to the various embodiments, the cover may include at least one of a protection cover having a screen protection function and a display device for providing a display function.

According to the various embodiments, at least one portion of the sensing unit may be formed of a flexible material.

Figure 4:
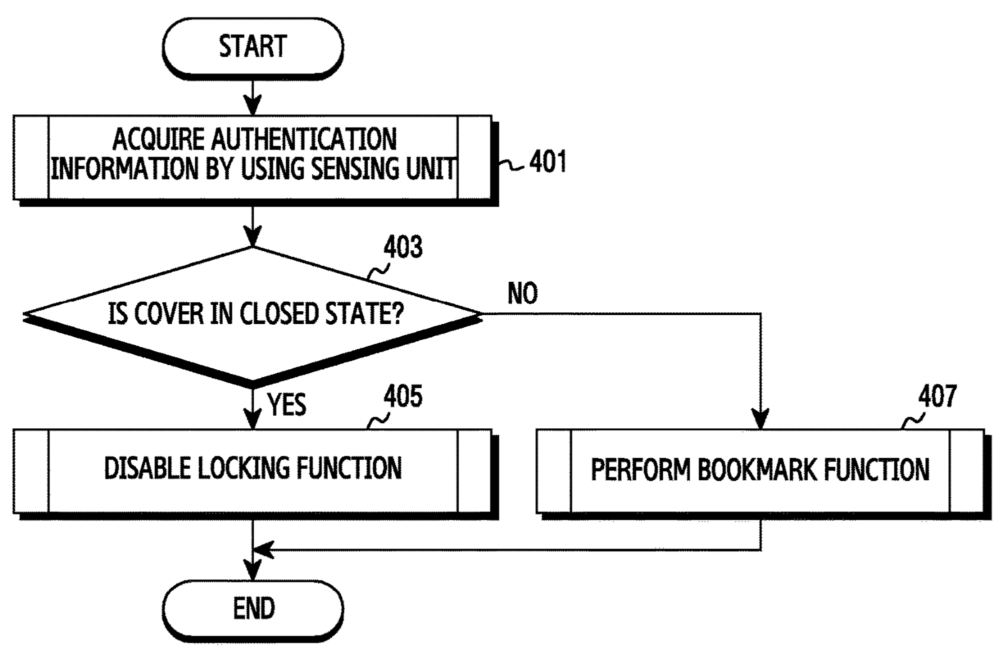
FIG. 4 is a flowchart of an example of a process, according to various embodiments of the present disclosure.

FIG. 4 is a flowchart of an example of a process, according to various embodiments of the present disclosure.

In operation 401, the electronic device 100 may acquire authentication information from the sensing unit 140. According to one embodiment, the electronic device 100 may acquire information collected by the sensing unit 140, and may authenticate a user who controls the electronic device 100 or the sensing unit 140 on the basis thereof. For example, the electronic device 100 may determine an input of a user who grips the sensing unit 140.

In operation 403, the electronic device 100 may detect whether the cover is in a closed state. For example, the closed state of the cover may be a state where the electronic device 100 and the cover are in contact with each other so that the screen of the electronic device 100 is not exposed. By contrast, an open state of the cover may be a state where the electronic device 100 and the cover are opened by maintaining a specific angle so that at least one portion of the screen of the electronic device 100 is exposed. In some implementations, the cover may be considered closed if the cover is rotated by less than a threshold angle from the position at which cover comes in contact with the display of the electronic device.

For example, the cover may be a cover having a screen protection function as shown in FIG. 3A. For another example, the cover may be a display device as shown in FIG. 3B.

Figure 7:
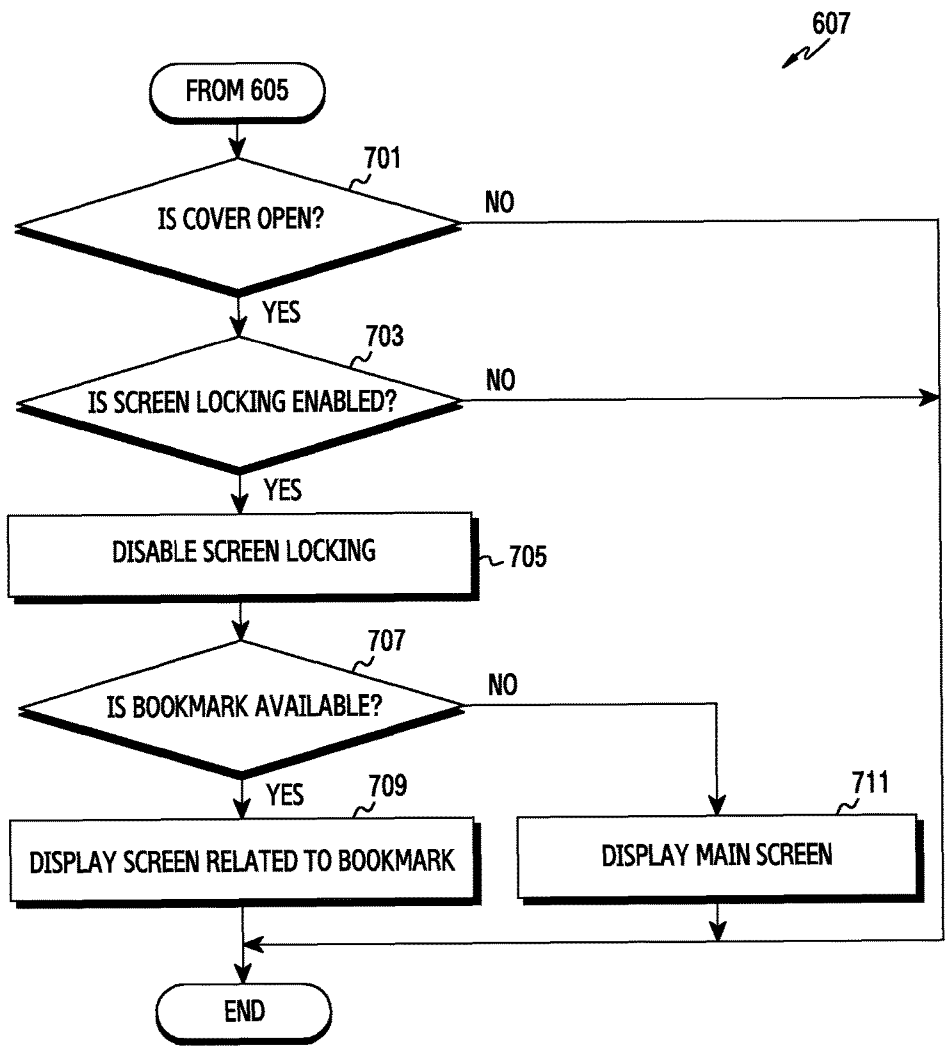
FIG. 7 is a flowchart of an example of a process associated with the process of FIG. 6, according to various embodiments of the present disclosure.
Figure 9A:
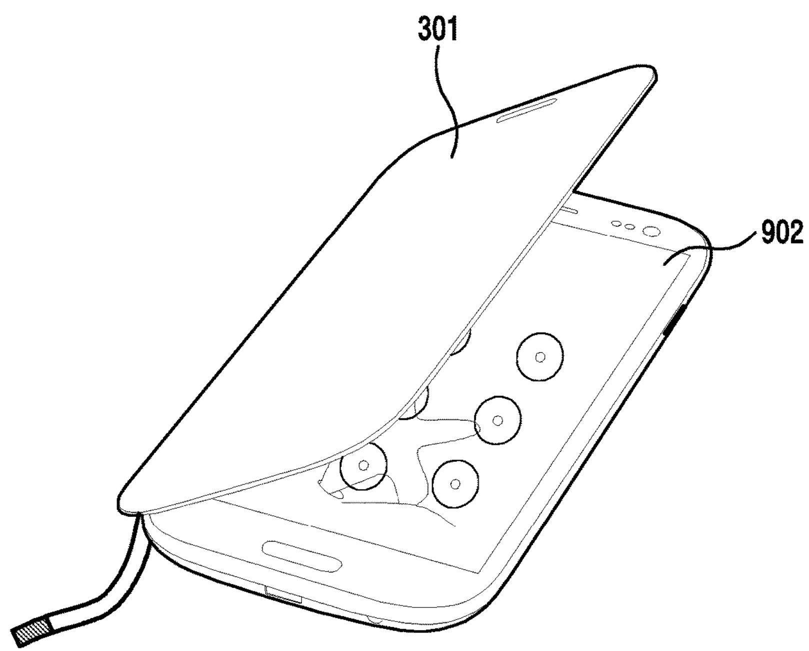
FIG. 9A is a diagram of an example of an electronic device, according to various embodiments of the present disclosure.
Figure 9B:
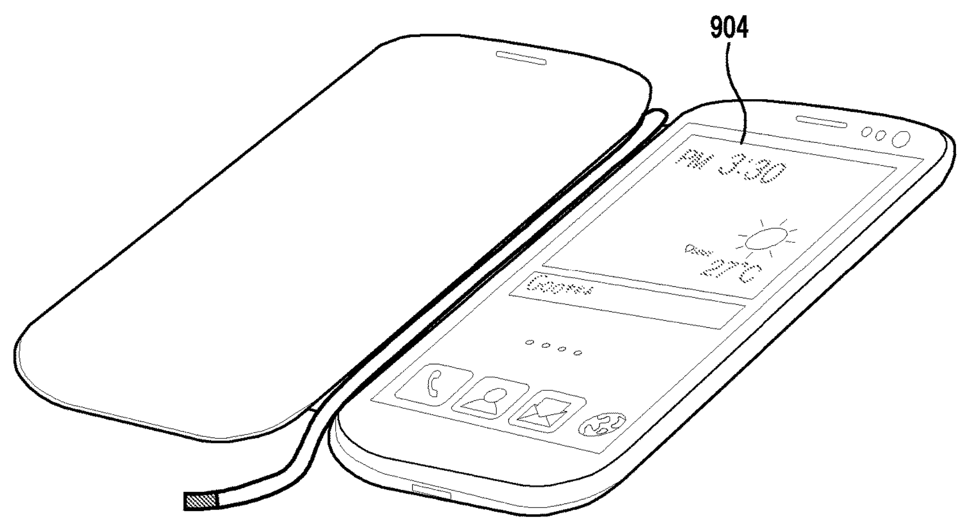
FIG. 9B is a diagram of an example of an electronic device, according to various embodiments of the present disclosure.

According to various embodiments, upon sensing an input for the sensing unit 140 in the closed state of the cover, the electronic device 100 may disable the locking function in operation 405. According to one embodiment, the electronic device 100 may disable the locking on the cover which maintains the locked state by predefined by turning off or reducing the magnetic force one or more magnets that are part of the electronic device 100 and/or the cover (e.g., magnetic members 302 and 312). In addition, the electronic device 100 may disable the screen locking as shown in FIG. 7 and FIG. 9B.

According to various embodiments, upon sensing the input for the sensing unit 140 in the open state of the cover, the electronic device 100 may perform a bookmark function in operation 407. For example, the electronic device 100 may register an execution screen currently being displayed and an application currently being executed as a bookmark.

Figure 5:
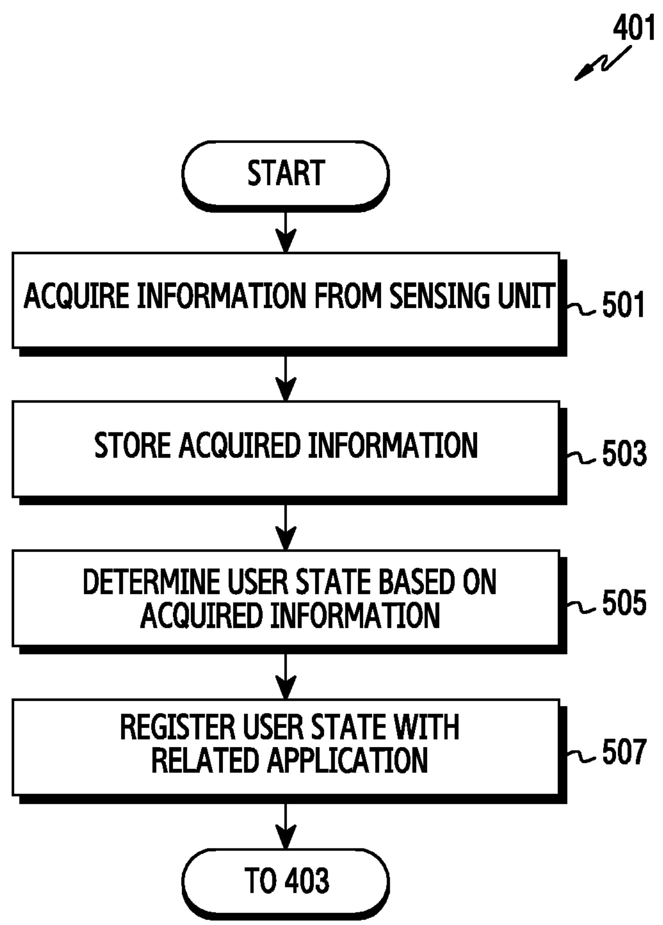
FIG. 5 is a flowchart of an example of a process associated with the process of FIG. 4, according to various embodiments of the present disclosure.

FIG. 5 is a flowchart of an example of a process for performing operation 401, according to various embodiments of the present disclosure.

In operation 501, the electronic device 100 may acquire sensor information collected by the sensing unit 140. For example, the electronic device 100 may acquire sensor information related to at least one of a user authentication, a body state, an input for the sensing unit 140, and a movement for the sensing unit 140. In addition, the electronic device 100 may connect to the sensing unit 140 on the basis of wired communication or wireless communication.

In operation 503, the electronic device 100 may store the sensor information acquired from the sensing unit 140 into a memory (e.g., the storing unit 130).

In operation 505, the electronic device 100 may determine a user's body state on the basis of the acquired sensor information. Herein, the body state may include at least one of a user's body temperature, heart rate, oxygen saturation, or the like. Thus, determining the user's body state may include determining a biometric characteristic of the user.

In operation 507, the electronic device 100 may register the user's body state (e.g., biometric characteristic) with a related application. Herein, the related application may be a health management application.

After registering the body state to the related application in operation 507, the electronic device 100 may proceed to operation 403.

Figure 6:
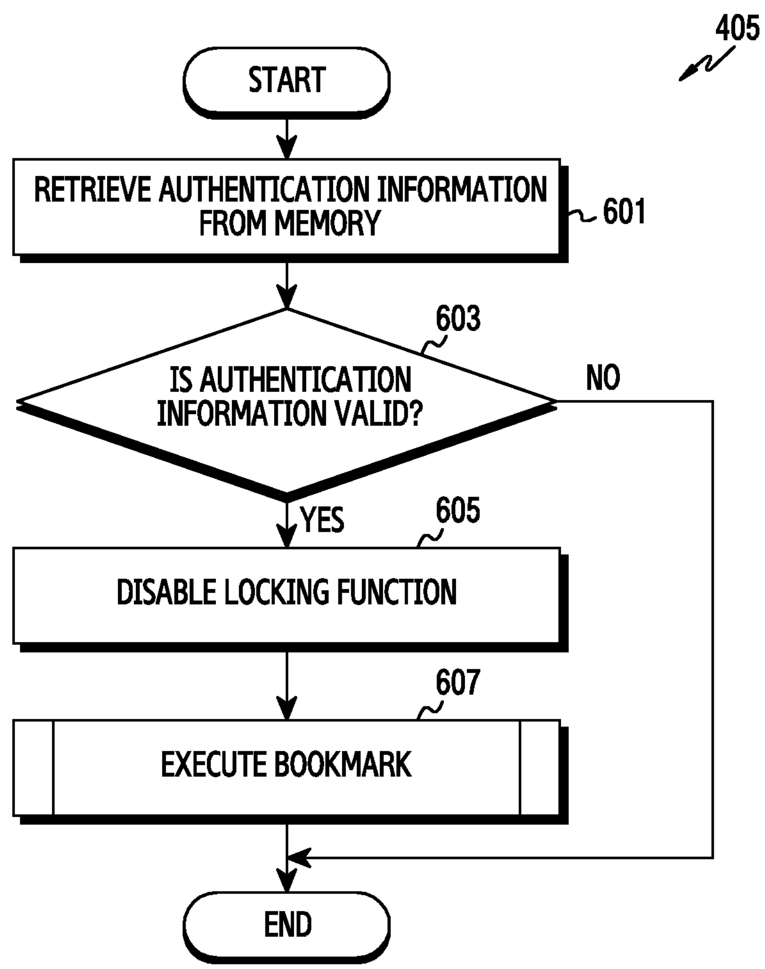
FIG. 6 is a flowchart of an example of a process associated with the process of FIG. 4, according to various embodiments of the present disclosure.
Figure 8A:
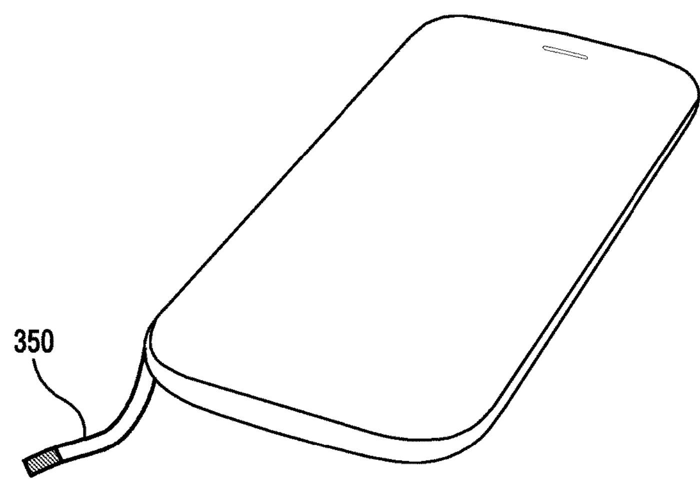
FIG. 8A is a diagram of an example of an electronic device, according to various embodiments of the present disclosure.
Figure 8B:
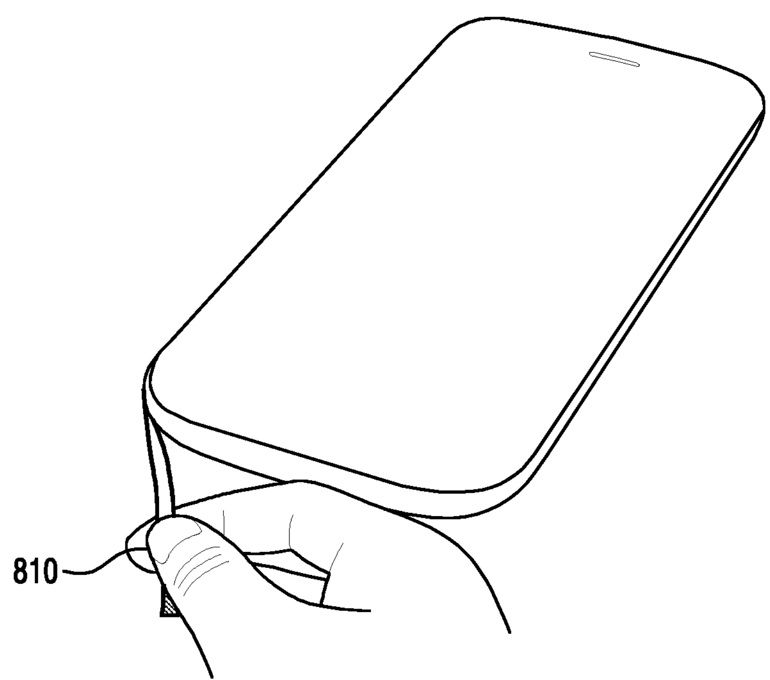
FIG. 8B is a diagram of an example of an electronic device, according to various embodiments of the present disclosure.
Figure 8C:
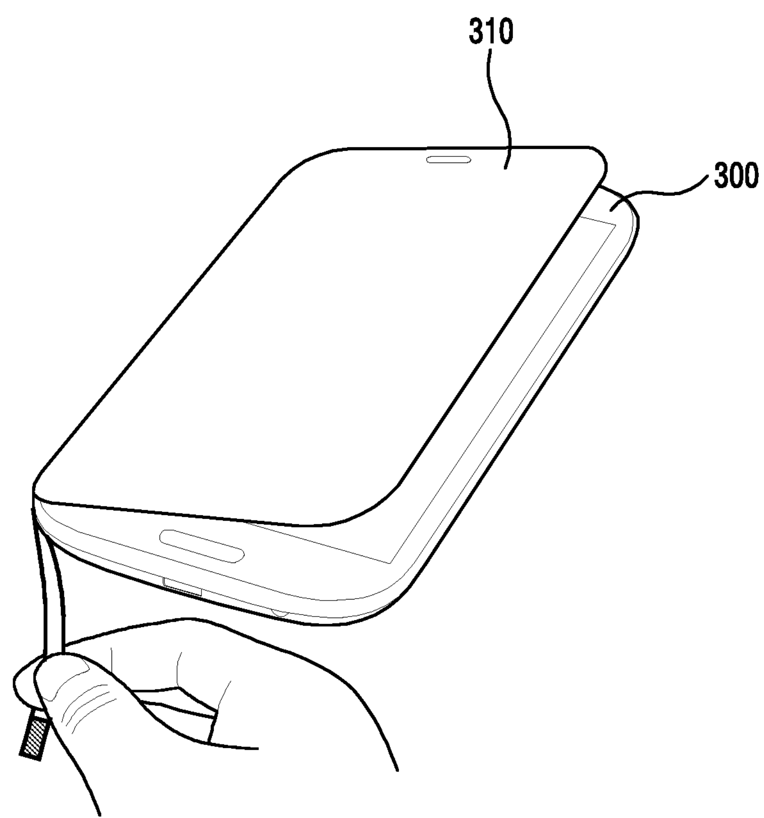
FIG. 8C is a diagram of an example of an electronic device, according to various embodiments of the present disclosure.

FIG. 6 is a flowchart of an example of a process for performing operation 405, according to various embodiments of the present disclosure. FIGS. 8A-C illustrate an example of a technique for disabling the locking function of the electronic device 100, according to various embodiments of the present disclosure.

In operation 601, the electronic device 100 may retrieve from memory sensor information collected by the sensing unit 140. Herein, the electronic device 100 may store the sensor information acquired from the sensing unit 140, and may acquire the authentication information (e.g., fingerprint information or the like) for user authentication among stored sensor information. For example, as shown in FIG. 8A, the electronic device 100 may expose the sensing unit 350 in a closed state of a cover. In addition, as shown in FIG. 8B, the electronic device 100 may sense an input 810 for the exposed sensing unit 350, and may acquire fingerprint information in response thereto.

In operation 603, the electronic device 100 may determine the validity of the authentication information. In other words, the electronic device 100 may compare the acquired authentication information with predefined authentication template to determine whether the authentication information acquired by the sensing unit 140 is valid.

According to various embodiments, if the authentication information acquired by the sensing unit 140 is the licensed authentication information, the electronic device 100 may disable the locking function for the cover in operation 605. According to one embodiment, as shown in FIG. 8C, the electronic device 100 may disable the locking on the cover 310. For example, the cover which is locked by using magnets that are part of the electronic device 100 (e.g., magnetic members 302 and 312) may be unlocked by turning off the magnets or reducing their magnetic force In operation 607, after disabling the locking function, the electronic device 100 may execute the bookmark function.

Figure 9C:
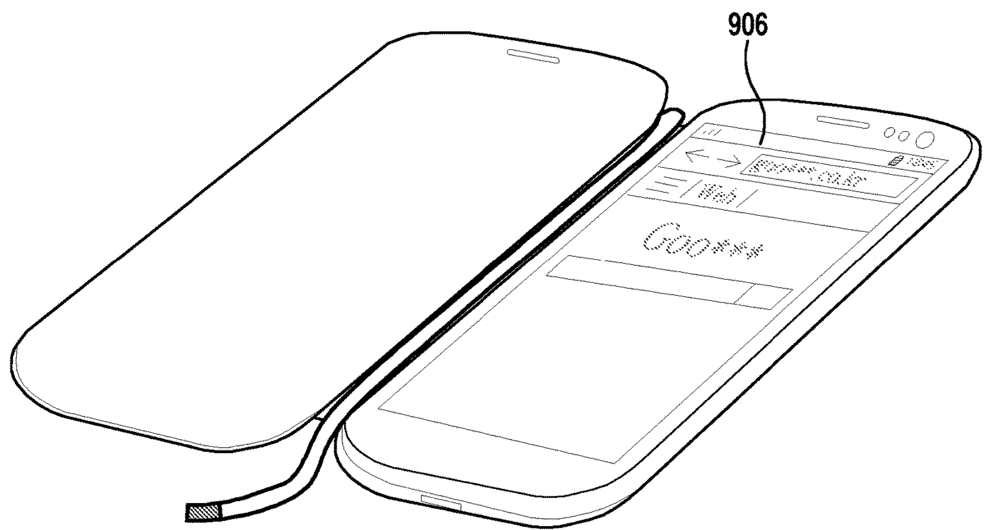
FIG. 9C is a diagram of an example of an electronic device, according to various embodiments of the present disclosure.

FIG. 7 is a flowchart of an example of a process for performing operation 607, according to various embodiments of the present disclosure. FIGS. 9A-C illustrate an example of a technique for performing the bookmark function of the electronic device 100, according to various embodiments of the present disclosure.

In operation 701, after a locking function is disabled, the electronic device 100 may determine whether a cover is open. That is, in response to acquiring of licensed authentication information, the electronic device 100 may determine whether it is a situation where a closed cover is open as shown in FIG. 9A.

According to various embodiments, upon determining the open state of the cover, the electronic device 100 may determine whether screen locking is enabled in operation 703. For example, the electronic device 100 may determine whether a screen displayed in response to the cover opening is a locking screen which requires an authentication operation as shown in a screen 902 of FIG. 9A.

According to various embodiments, upon detecting that the screen locking is enabled, the electronic device 100 may disable the screen locking in operation 705. In this case, after disabling the screen locking, the electronic device 100 may display a main screen 904 as shown in FIG. 9B.

In operation 707, the electronic device 100 may detect whether a registered bookmark is available. According to one embodiment, the electronic device 100 may detect whether there is a function executed when the cover is closed.

According to various embodiments, upon detecting that the registered bookmark is available, the electronic device 100 may display a screen related to the registered bookmark in operation 709. For example, if a bookmark for a web page is available, the electronic device 100 may display a screen 906 (e.g., a web screen) corresponding to information on the registered bookmark as shown in FIG. 9C.

According to various embodiments, upon detecting that the registered bookmark is not available, the electronic device 100 may display the main screen in operation 711.

According to various embodiments of the present disclosure, after displaying the screen related to the registered bookmark in operation 709, the electronic device 100 may register a body state (e.g., a biometric characteristic of the user) with a related application.

Figure 10:
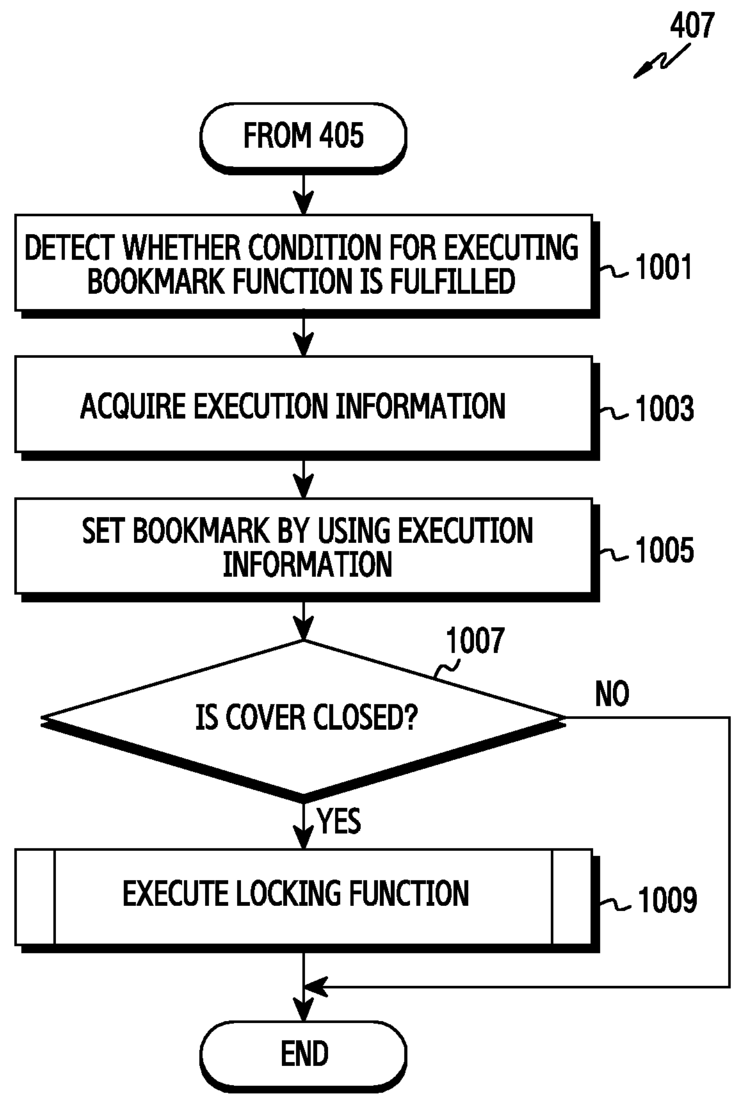
FIG. 10 is a flowchart of an example of a process associated with the process of FIG. 4, according to various embodiments of the present disclosure.
Figure 12A:
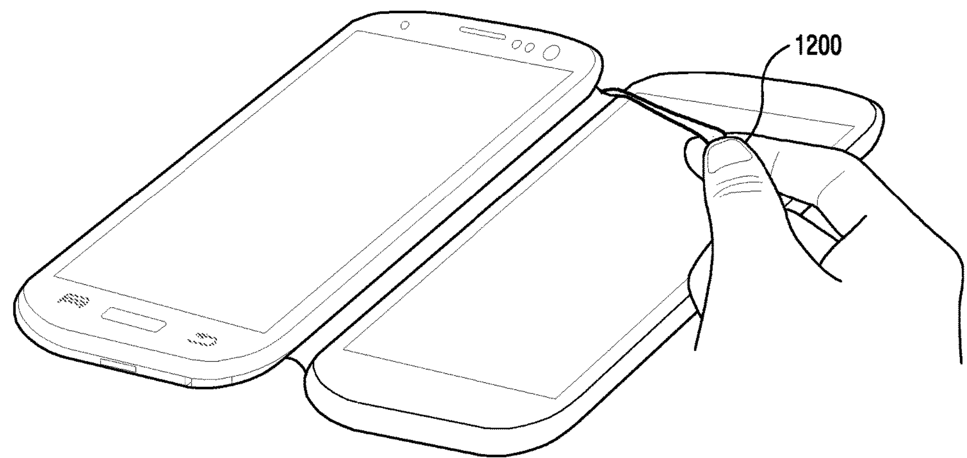
FIG. 12A is a diagram illustrating the operation of an electronic device, according to various embodiments of the present disclosure.
Figure 12B:
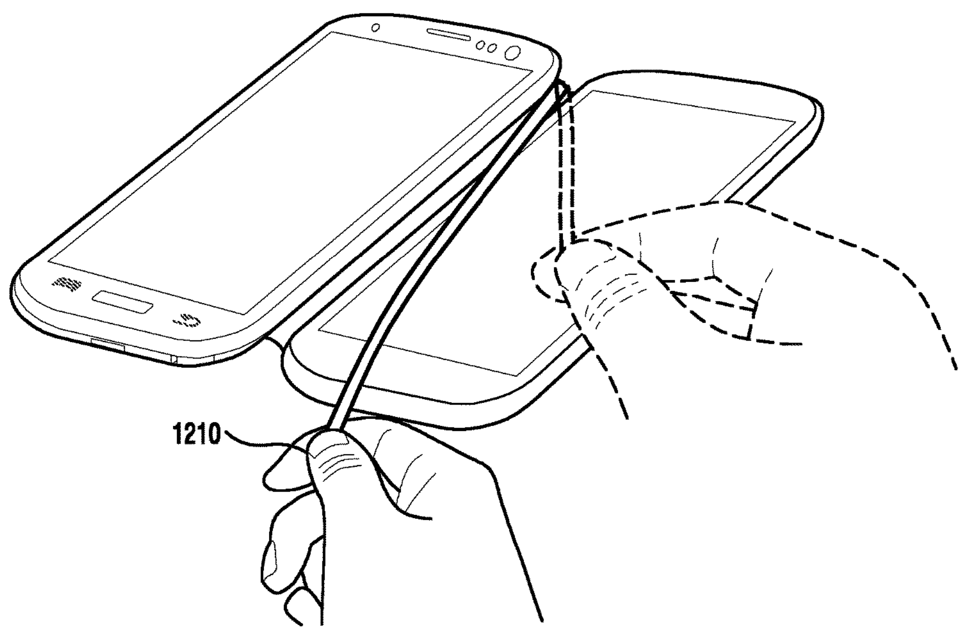
FIG. 12B is a diagram illustrating the operation of an electronic device, according to various embodiments of the present disclosure.

FIG. 10 is a flowchart of an example of a process for performing operation 407, according to various embodiments of the present disclosure. Further, FIGS. 12A-B illustrate an example of a technique for executing the bookmark function of the electronic device 100, according to various embodiments of the present disclosure.

In operation 1001, the electronic device 100 may detect that the condition for executing the bookmark function is fulfilled. For example, according to one embodiment, the condition may be related to a movement of the sensing unit 140. That is, the electronic device 100 may determine that the condition for executing the bookmark function is fulfilled in response to changing of a state 1200 where a user grips the sensing unit 140 as shown in FIG. 12A to a state 1210 of moving to a specific position as shown in FIG. 12B. As another example, the electronic device 100 may determine that the condition for executing the bookmark function is fulfilled in response to locating the sensing unit 140 between the electronic device 100 and the cover.

In operation 1003, the electronic device 100 may acquire execution information for an application. Herein, the execution information may be related to at least one of a name, reproduction time point, display content, or the like of the application being executed.

In operation 1005, the electronic device 100 may set the execution information as a bookmark.

In operation 1007, the electronic device 100 may determine whether the cover is closed. That is, the electronic device 100 may determine whether it is a situation where an opened cover is closed.

According to various embodiments, upon detecting that the cover is closed, the electronic device 100 may execute a locking function in operation 1009.

According to various embodiments, operations 1003-1009 can be executed in response to detecting that the condition for executing the bookmark function is fulfilled.

Figure 11:
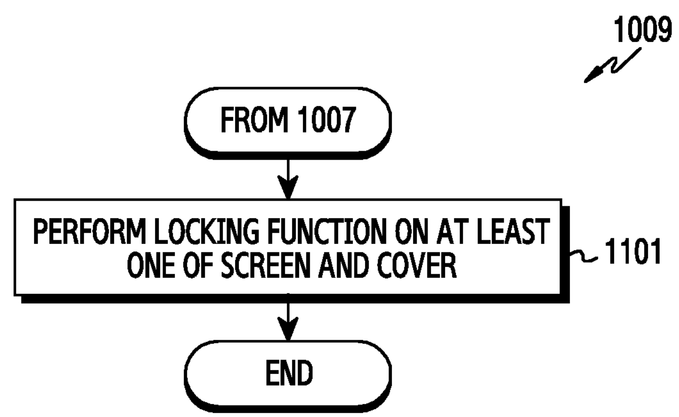
FIG. 11 is a flowchart of an example of a process associated with the process of FIG. 10, according to various embodiments of the present disclosure.

FIG. 11 is a flowchart of an example of a process for performing operation 1009, according to various embodiments of the present disclosure.

In operation 1101, the electronic device 100 may execute at least one locking function, i.e., screen locking and/or cover locking.

According to various embodiments, the electronic device 100 may execute the screen locking when the cover is closed to display a screen which requires an authentication operation when the cover is open.

According to various embodiments, when the cover is closed, the electronic device 100 may cause a magnet (e.g., electromagnet) to maintain the cover in the locked state.

According to various embodiments, a method of controlling a function of an electronic device may include collecting information related to authentication by using a sensing unit, detecting a state of a cover operatively coupled to the electronic device, and disabling a locking function in response to a state where the cover is opened to an extent of at least a threshold, after collecting information satisfying a condition.

According to the various embodiments, the method of controlling the function of the electronic device may include, after the disabling of the locking function, displaying a screen corresponding to predefined bookmark information.

According to the various embodiments, the method of controlling the function of the electronic device may include, before the disabling of the locking function, maintaining a closed state of the cover by using magnets, and controlling the magnets so that the closed state is not maintained in response to the collecting of authentication information satisfying a condition by the sensing unit.

According to the various embodiments, the collecting of the information related to the authentication by using the sensing unit may include collecting information capable of determining a body state, and determining and storing the body state by using the collected information.

According to the various embodiments, the method of controlling the function of the electronic device may include, after the disabling of the locking function, collecting information capable of determining a movement of the sensing unit, and setting information related to a function being executed as bookmark information in response to the sensing of the movement satisfying the condition.

According to the various embodiments, the method of controlling the function of the electronic device may include, after the disabling of the locking function, setting information related to a function being executed as bookmark information in response to a state where the cover is closed to an extent of at least a threshold.

According to the various embodiments, the method of controlling the function of the electronic device may include, after disabling the locking function, executing the locking function in response to the state where the cover is closed to the extent of at least the threshold.

According to the various embodiments, the executing of the locking function may include controlling at least one magnet to maintain a closed state of the cover.

According to the various embodiments, the cover may include at least one of a protection cover having a screen protection function and a display device for providing a display function.

According to various embodiments, a method for controlling a function and an electronic device for handling the method can sense a condition of opening a cover, and if the condition is satisfied, can disable a screen locking function in response to the cover opening.

FIGS. 1-12B are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. An electronic device comprising:

a cover;

a sensing unit configured to connect to a body of the electronic device and comprise a first sensor and a second sensor;

at least one processor; and a memory configured to store instructions that, when executed, cause the processor to:

detect an input for the sensing unit via the first sensor;

in response to detecting the input for the sensing unit, determine whether a state of the cover is an opened state or a closed state; and detect, based on the second sensor, a movement of the sensing unit while the input is being detected in response to detecting that the cover is in an opened state;

perform a bookmark function associated with an application being executed in response to detecting the movement of the sensing unit, wherein the movement of the sensing unit is detectable based on the second sensor while the body of the electronic device is not moved.

2. The electronic device of claim 1, further comprising:

a display, wherein the instructions cause the processor to control the display to display a screen that corresponds to a pre-registered bookmark in response to detecting that the cover is in a closed state.

3. The electronic device of claim 1, further comprising:

a magnetic material;

wherein the instructions cause the processor to control a magnetic force of the magnetic material to change a state of cover from a closed state to an opened state in response to detecting that the cover is in the closed state.

4. The electronic device of claim 1, wherein the instructions cause the processor to acquire biometric information for the input via the first sensor, and perform an authentication process based on the biometric information.

5. The electronic device of claim 1, wherein the instructions cause the processor to:

determine whether the movement satisfies a predefined condition; and register information associated with the application being executed as a bookmark in the memory in response to detecting that the movement satisfies the predefined condition.

6. The electronic device of claim 1, wherein at least a portion of the sensing unit is formed of a flexible material.

7. The electronic device of claim 1, further comprising:

a display configure to display an execution screen of the application being executed, wherein the instructions cause the processor to register information associated with the application being executed as a bookmark in the memory.

8. The electronic device of claim 7, further comprising:

a magnetic material;

wherein the instructions cause the processor to detect whether the state of cover is changed to a closed state, and control the magnetic force of the magnetic material to maintain the closed state if the state of cover is changed to a closed state.

9. The electronic device of claim 1, wherein the cover comprises at least one of a protection cover and a display.

10. A method for use in an electronic device, comprising:

detecting an input for a sensing unit via a first sensor included in the sensing unit;

in response to detecting the input for the sensing unit, determining whether a state of a cover of the electronic device is an opened state or a closed state; and detecting, based on a second sensor included in the sensing unit, a movement of the sensing unit while the input is being detected, in response to detecting that the cover is in an opened state;

performing a bookmark function associated with an application being executed in response to detecting the movement of the sensing unit, wherein the sensing unit is configured to connect a body of the electronic device, and comprise the first sensor and the second sensor, and wherein the movement of the sensing unit is detectable based on the second sensor while the body of the electronic device is not moved.

11. The method of claim 10, further comprising:

displaying a screen corresponding to a preregistered bookmark in response to detecting that the cover is in a closed state.

12. The method of claim 10, further comprising:

controlling a magnetic force of the magnetic material to change a state of cover from a closed state to an opened state in response to detecting that the cover is in a closed state.

13. The method of claim 10, further comprising:

acquiring biometric information for the input via the first sensor; and performing an authentication process based on the biometric information.

14. The method of claim 10, wherein performing a bookmark function comprising:

determining whether the movement satisfies a predefined condition; and registering information associated with the application being executed as a bookmark in the memory in response to detecting that the movement satisfies the predefined condition.

15. The method of claim 10, wherein performing a bookmark function comprises registering information associated with the application being executed as a bookmark.

16. The method of claim 15, further comprising:

detecting whether the state of cover is changed to a closed state, and controlling the magnetic force of the magnetic material to maintain the closed state if the state of cover is changed to a closed state.

17. The method of claim 10, wherein the cover comprises at least one of a protection cover and a display.

18. A non-transitory computer readable medium storing one or more processor-executable instructions which when executed by at least one processor cause the at least one processor to execute a method comprising the steps of:

detecting an input for a sensing unit via a first sensor included in the sensing unit;

in response to detecting the input for the sensing unit, determining whether a state of a cover of an electronic device is an opened state or a closed state; and detecting, based on a second sensor included in the sensing unit, a movement of the sensing unit while the input is being detected, in response to detecting that the cover is in an opened state;

performing a bookmark function associated with an application being executed in response to detecting the movement of the sensing unit, wherein the sensing unit is configured to connect a body of the electronic device, and comprise the first sensor and the second sensor, and wherein the movement of the sensing unit is detectable based on the second sensor while the body of the electronic device is not moved.

* * * * *